United States Patent
Lee et al.

(10) Patent No.: US 11,051,144 B2
(45) Date of Patent: Jun. 29, 2021

(54) V2X COMMUNICATION METHOD PERFORMED BY V2X TERMINAL IN WIRELESS COMMUNICATION SYSTEM AND TERMINAL USING SAME METHOD

(71) Applicant: LG ELECTRONICS INC., Seoul (KR)

(72) Inventors: Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 16/497,410

(22) PCT Filed: Mar. 26, 2018

(86) PCT No.: PCT/KR2018/003558
§ 371 (c)(1),
(2) Date: Sep. 24, 2019

(87) PCT Pub. No.: WO2018/174690
PCT Pub. Date: Sep. 27, 2018

(65) Prior Publication Data
US 2020/0045516 A1    Feb. 6, 2020

Related U.S. Application Data

(60) Provisional application No. 62/476,719, filed on Mar. 24, 2017.

(51) Int. Cl.
*H04W 4/40* (2018.01)
*H04L 5/00* (2006.01)
*H04W 72/04* (2009.01)

(52) U.S. Cl.
CPC ........... *H04W 4/40* (2018.02); *H04L 5/0048* (2013.01); *H04W 72/0446* (2013.01)

(58) Field of Classification Search
CPC . H04L 27/2602; H04L 27/261; H04L 5/0048; H04L 5/0082; H04W 4/40; H04W 72/0446
See application file for complete search history.

(56) References Cited

U.S. PATENT DOCUMENTS

2016/0270059 A1* 9/2016 Chen ................. H04L 5/0051
2018/0139083 A1* 5/2018 Hosseini .............. H04L 5/0094
(Continued)

FOREIGN PATENT DOCUMENTS

KR   20120131163 A  * 12/2012  ......... H04B 1/70718
KR   1020120131163      12/2012
(Continued)

OTHER PUBLICATIONS

PCT International Application No. PCT/KR2018/003558, International Search Report dated Oct. 25, 2018, 6 pages.
(Continued)

*Primary Examiner* — Saad A. Waqas
(74) *Attorney, Agent, or Firm* — Lee Hong Degerman Kang Waimey

(57) ABSTRACT

The present invention provides a short transmission time interval (S-TTI)-based vehicle-to-X (V2X) communication method performed by a V2X terminal in a wireless communication system, in which the S-TTI is relatively shorter than a legacy transmission time interval (L-TTI), the method comprising: determining information used for generation of a demodulation reference signal (DMRS) sequence and information used for channel scrambling; and performing the S-TTI-based V2X communication on the basis of the determination, wherein the L-TTI corresponds to a plurality of S-TTIs.

8 Claims, 18 Drawing Sheets

(56) References Cited

U.S. PATENT DOCUMENTS

2018/0176043 A1* 6/2018 Kim ...................... H04L 5/0048
2019/0116583 A1* 4/2019 Sahlin ................... H04L 5/0007

FOREIGN PATENT DOCUMENTS

| KR | 102017028316 | 3/2017 |
|----|--------------|---------|
| WO | 2016200236 | 12/2016 |
| WO | 2017038892 | 3/2017 |

OTHER PUBLICATIONS

Huawei, et al., "Discussion on sTTI scheduling", 3GPP TSG RAN WG1 Meeting #88, R1-1701733, Feb. 2017, 10 pages.

3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.5.0, Dec. 2008, 82 pages.

European Patent Office Application Serial No. 18771229.4, Search Report dated Feb. 14, 2020, 9 pages.

ITL, "DM-RS sequence for PSCCH/PSSCH/PSBCH in V2V", 3GPP TSG RAN WG1 Meeting #86, R1-167750, Aug. 2016, 4 pages.

Japan Patent Office Application No. 2019-552571, Office Action dated Dec. 1, 2020, 7 pages.

Intel Corporation, "On PSSCH DMRS Signal Generation and Performance Analysis", R1-1702138, 3GPP TSG RAN1 WG Meeting #88, Feb. 2017, 5 pages.

* cited by examiner

V2X COMMUNICATION METHOD PERFORMED BY V2X TERMINAL IN WIRELESS COMMUNICATION SYSTEM AND TERMINAL USING SAME METHOD

CROSS-REFERENCE TO RELATED APPLICATIONS

This application is the National Stage filing under 35 U.S.C. 371 of International Application No. PCT/KR2018/003558, filed on Mar. 26, 2018, which claims the benefit of U.S. Provisional Application No. 62/476,719, filed on Mar. 24, 2017, the contents of which are all hereby incorporated by reference herein in their entirety.

BACKGROUND

Field

The present document relates to wireless communication and, more particularly, to a method of performing V2X communication, which is performed by a V2X UE in a wireless communication system and a UE using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

D2D communication may be extended and applied to the transmission and reception of signals between vehicles. Communication related to a vehicle is specially called vehicle-to-everything (V2X) communication. In V2X, the term "X" means a pedestrian (communication between a vehicle and a device carried by an individual (e.g., handheld terminal carried by a pedestrian, cyclist, driver or passenger), wherein V2X may be indicated as V2P), vehicle (communication between vehicles) (V2V), infrastructure/network (communication between a vehicle and a roadside unit (RSU)/network (e.g.,) RSU is a transportation infrastructure entity (e.g.,) an entity transmitting speed notifications) implemented in an eNB or a stationary UE)) (V2I/N). A (V2P communication-related) device held by a pedestrian (or person) is named a "P-UE", and a (V2X communication-related) device installed on a vehicle is named a "V-UE." In the present document, a term "entity" may be interpreted as at least one of a P-UE, a V-UE, or an RSU (/network/infrastructure).

As described above, conventionally, a transmission time interval (TTI) was determined in a 1 ms unit. In a future communication system, to introduce TTI-based V2X communication shorter than a conventional one is assumed.

In such a condition, conventionally, only UEs performing wireless communication based on the existing TTI (e.g., 1 ms) were assumed. Accordingly, there is no separate definition regarding that a UE will generate a DMRS using which method when performing short TTI-based V2X communication and will perform sequence generation using which method.

Accordingly, it is necessary to define that a UE performing short TTI-based V2X communication will generate a DMRS using which method and will perform sequence generation using which method.

A method of determining, by a UE, information on a DMRS and information on scrambling in order to perform V2X communication based on an S-TTI and an apparatus using the method in order to solve the problems are described below.

SUMMARY

The present document provides a method of performing V2X communication, which is performed by a V2X UE, in a wireless communication system and a UE using the method.

In an aspect, a method of performing vehicle-to-X (V2X) communication based on a relatively short transmission time interval (S-TTI) compared to an existing legacy TTI (L-TTI) in a wireless communication system is provided. The method performed by a V2X UE may comprise determining information used for demodulation reference signal (DMRS) sequence generation and information used for channel scrambling; and performing V2X communication based on the S-TTI based on the determination, wherein the L-TTI corresponds to a plurality of S-TTIs.

The information used for the DMRS sequence generation may be determined in unit of the S-TTI or is determined in unit of the L-TTI.

If the information used for DMRS sequence generation is determined in unit of the S-TTI, the information used for DMRS sequence generation may have a different value for each S-TTI, wherein the values sequentially increase in one frame.

The information used for DMRS sequence generation may follow an equation below, information used for DMRS sequence generation=(N*K+Q−1), wherein the N is a value of an index of the L-TTI in the one frame, wherein the N is equal to or greater than 0 and is equal to or smaller than 9, the K is a value of a number of S-TTIs included in the L-TTI, wherein the K has a positive integer, and the Q is a value of the S-TTI at which place in the L-TTI, wherein the Q has a value equal to or smaller than K.

If the information used for DMRS sequence generation is determined in unit of the L-TTI, the information used for DMRS sequence generation may have an identical value in an identical L-TTI.

The information used for DMRS sequence generation may follow an equation below, information used for DMRS sequence generation=(N*2+(J MODULO 2)), the N is a value of an index of the L-TTI in the one frame, wherein the N is equal to or greater than 0 and is equal to or smaller than 9, the J is a value of an index of a slot based on the L-TTI in the one frame, wherein the J is equal to or greater than 0 and is equal to or smaller than 19, and the MODULO is a modular operation.

The modular operation may be an operation for calculating a remainder value.

The information used for channel scrambling may be determined in unit of the S-TTI or has a value identical with a value of the information used for DMRS sequence generation or a plurality of pre-configured S-TTIs is determined to have an identical value.

If the S-TTI is a basic resource unit, the L-TTI may be a combination of K basic resource units, and the K is a positive integer.

If the L-TTI is a basic resource unit, the S-TTI may be X S-TTIs split from the basic resource unit, and the X is a positive integer.

The V2X UE may determines whether the V2X communication based on the L-TTI and the V2X communication based on the S-TTI coexist, and the V2X UE determines the information used for DMRS sequence generation and the information used for channel scrambling based on whether the V2X communication based on the L-TTI and the V2X communication based on the S-TTI coexist.

The V2X UE may determine the information used for DMRS sequence generation in unit of the L-TTI, and the V2X UE determines the information used for channel scrambling in unit of the S-TTI.

The information used for DMRS sequence generation and the information used for channel scrambling may be configured in the UE.

In another aspect, a vehicle-to-X (V2X) user equipment (UE) performing V2X communication based on a relatively short (S-TTI) compared to an existing legacy transmission time interval (L-TTI) is provided. The V2X UE may comprise a transceiver configured to transmit and receive radio signals; and a processor operatively connected to the transceiver, wherein the processor is configured to: determine information used for demodulation reference signal (DMRS) sequence generation and information used for channel scrambling; and perform V2X communication based on the S-TTI based on the determination, wherein the L-TTI corresponds to a plurality of S-TTIs.

According to the present document, there is defined that an S-TTI-based UE will use an S-TTI as a reference for a parameter used for DMRS generation or use an L-TTI as the reference. In relation to channel scrambling, there is defined that an S-TTI-based UE will use an S-TTI as a reference for a parameter used for channel scrambling or use an L-TTI as the reference.

DESCRIPTION OF EXEMPLARY EMBODIMENTS

The definition of terms in the specification to be described hereinafter and the abbreviations of the terms may be defined in 3gpp TS 36 series unless they are not separately described.

Figure 1:
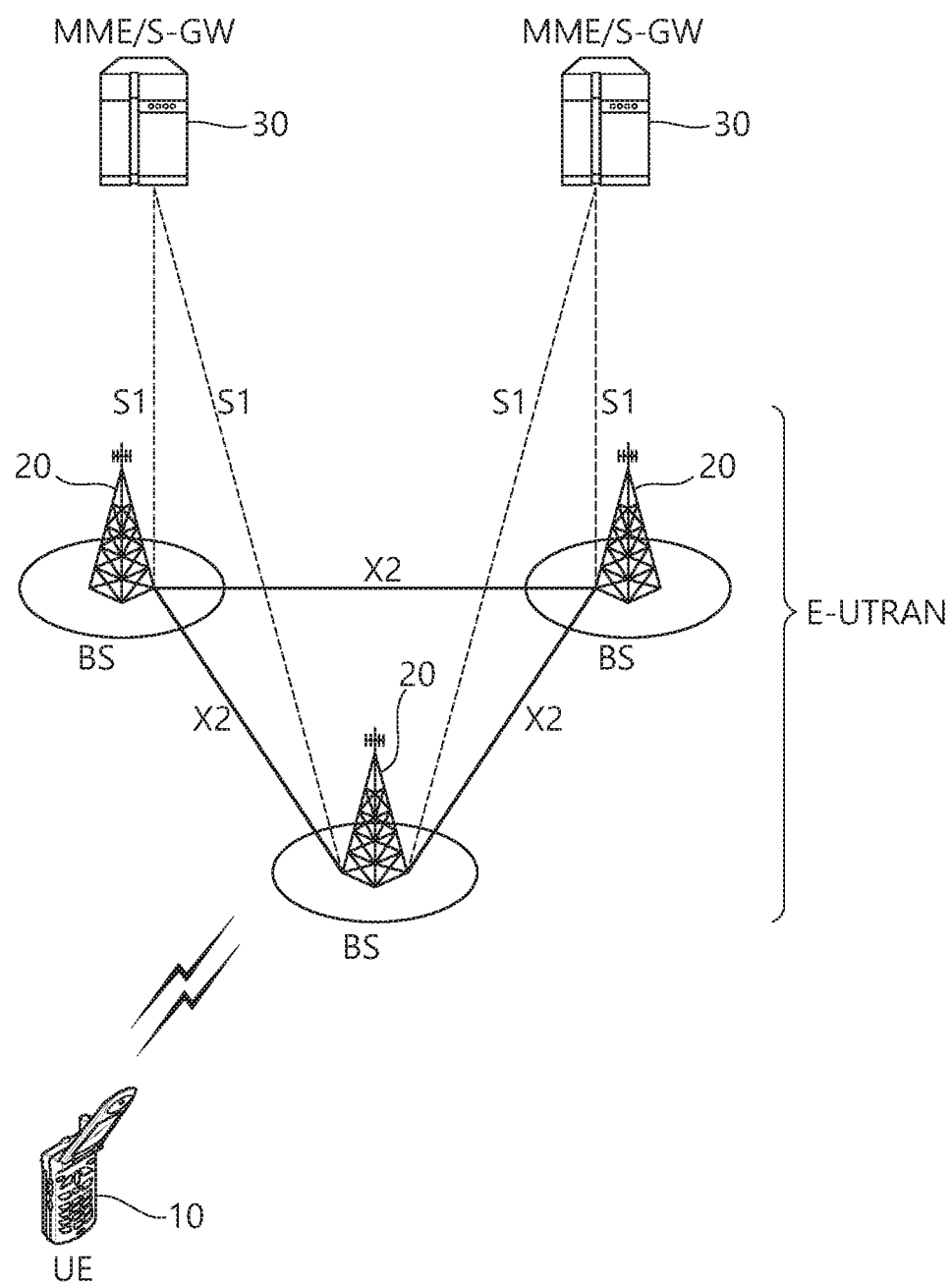
FIG. 1 shows a wireless communication system to which the present document is applied.

FIG. 1 shows a wireless communication system to which the present document is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 2:
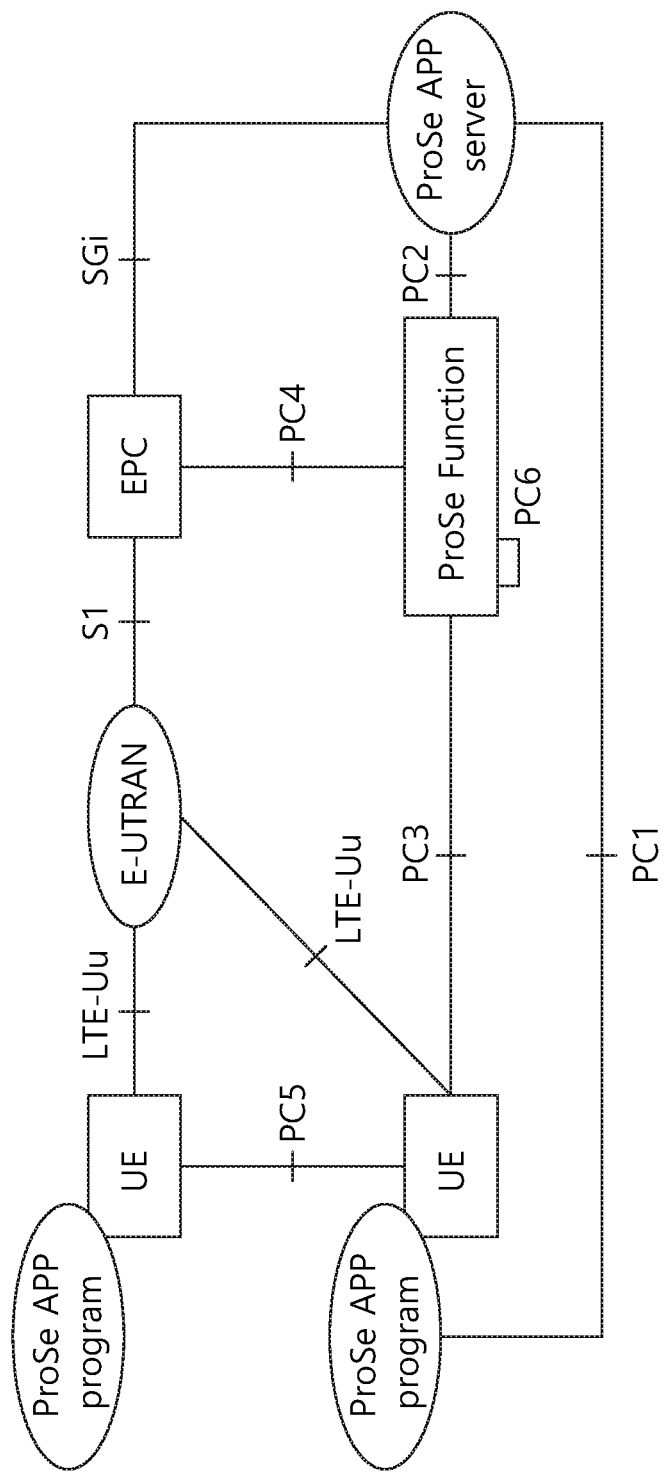
FIG. 2 illustrates a reference structure for a ProSe.

FIG. 2 illustrates a reference structure for a ProSe.

Referring to FIG. 2, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
  Interworking via a reference point towards the 3rd party applications
  Authorization and configuration of the UE for discovery and direct communication)
  Enable the function of the EPC level ProSe discovery
  ProSe related new subscriber data and handling of data storage, and also handling of ProSe identities
  Security related function
  Provide control towards the EPC for policy related function
  Provide function for charging (via or outside of EPC, e.g., offline charging))

Hereinafter, a reference point and a reference interface will be described in a reference structure for the ProSe.
  PC1: a reference point between a ProSe application program in the terminal and a ProSe application program in a ProSe application server. The PC1 is used to define signaling requirements in an application level.
  PC2: is a reference point between the ProSe application server and a ProSe function. The PC2 is used to define an interaction between the ProSe application server and a ProSe function. An application data update of a ProSe database of the ProSe function may be an example of the interaction.
  PC3: is a reference point between the terminal and the ProSe function. The PC3 is used to define an interaction between the terminal and the ProSe function. Configuration for ProSe discovery and communication may be an example of the interaction.
  PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
  PC5: is a reference point to use control/user plane for discovery, communication, and relay between terminals, and 1:1 communication.
  PC6: is a reference point to use a function such as ProSe discovery between users included in different PLMNs.
  SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 3:
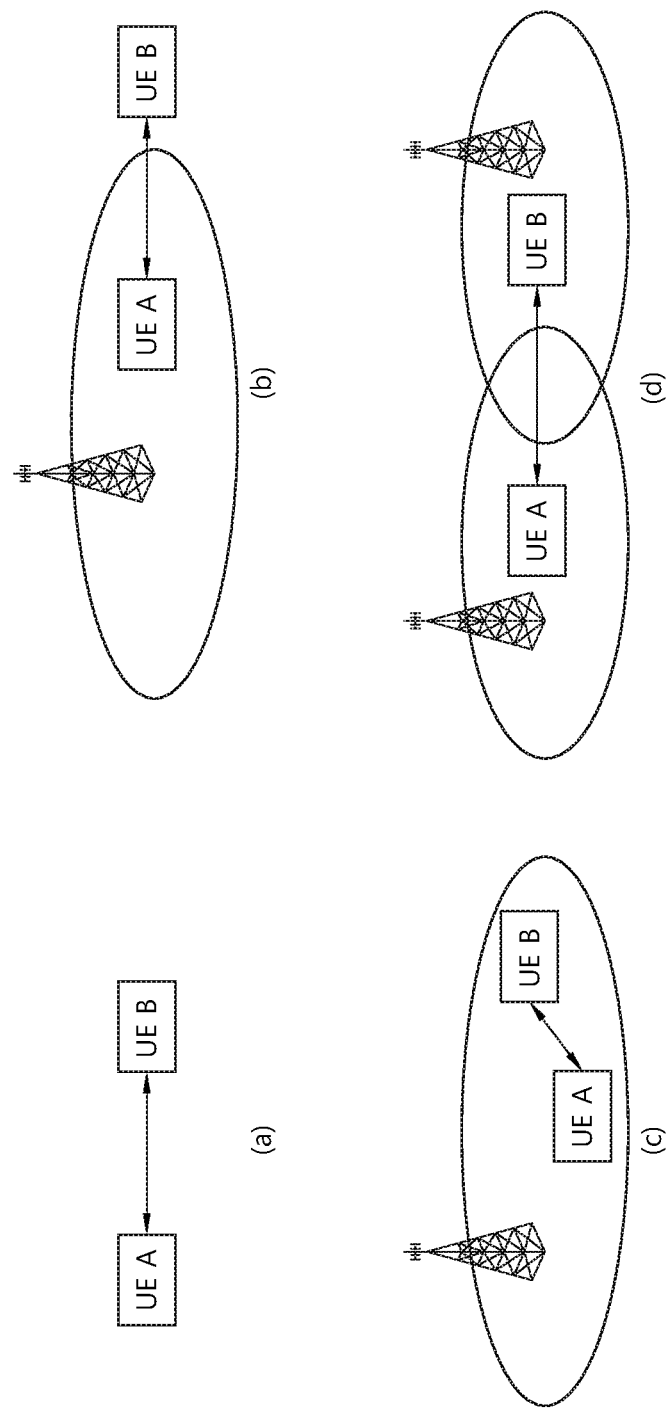
FIG. 3 illustrates arrangement examples of terminals performing ProSe direct communication and cell coverage.

FIG. 3 illustrates arrangement examples of terminals performing ProSe direct communication and cell coverage.

Referring to FIG. 3(a), UEs A and B may be located outside of the cell coverage. Referring to FIG. 3(b), the UE A may be located in the cell coverage and the UE B may be located outside of the cell coverage. Referring to FIG. 3(c), both of UEs A and B may be located in the cell coverage. Referring to FIG. 3(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 4:
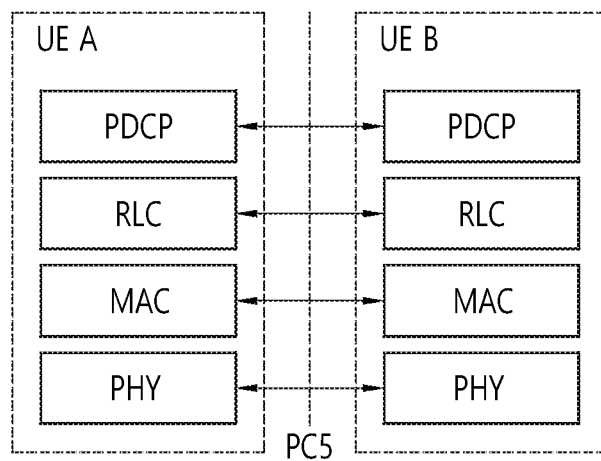
FIG. 4 illustrates a user plane protocol stack for the ProSe direct communication.

FIG. 4 illustrates a user plane protocol stack for the ProSe direct communication.

Referring to FIG. 4, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 5:
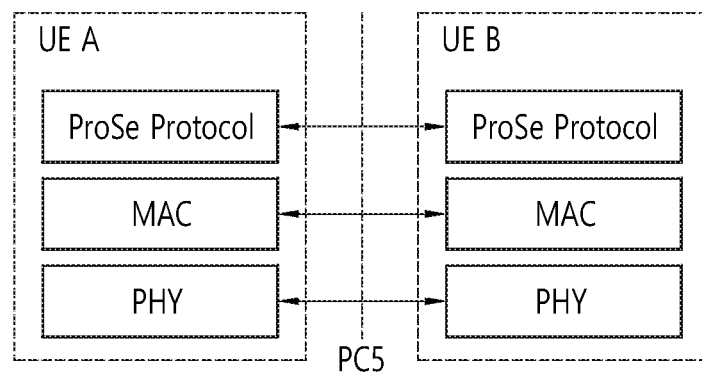
FIG. 5 illustrates a PC 5 interface for D2D discovery.

FIG. 5 illustrates a PC 5 interface for D2D discovery.

Referring to FIG. 5, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 6:
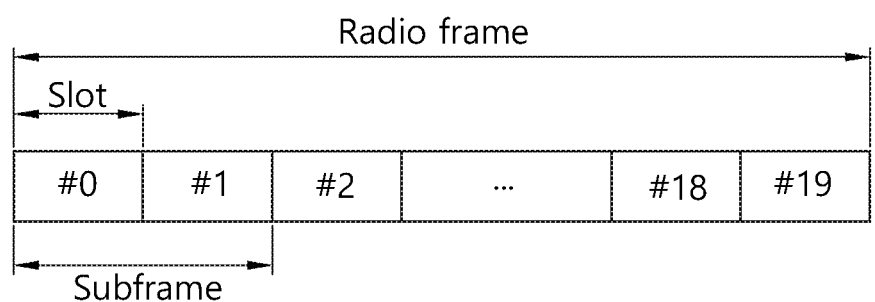
FIG. 6 shows a radio frame structure of 3GPP LTE.

FIG. 6 shows a radio frame structure of 3GPP LTE.

Referring to FIG. 6, a radio frame is configured with 10 subframes. One subframe is configured with 2 slots. For example, the length of one subframe may be 1 ms, and the length of one slot may be 0.5 ms. The time taken for one subframe to be transmitted is called a transmission time interval (TTI). A TTI may be a minimum unit of scheduling. The structure of a radio frame is merely an example. The number of subframes included in a radio frame and the number of slots included in a subframe may be different in various ways.

Figure 7:
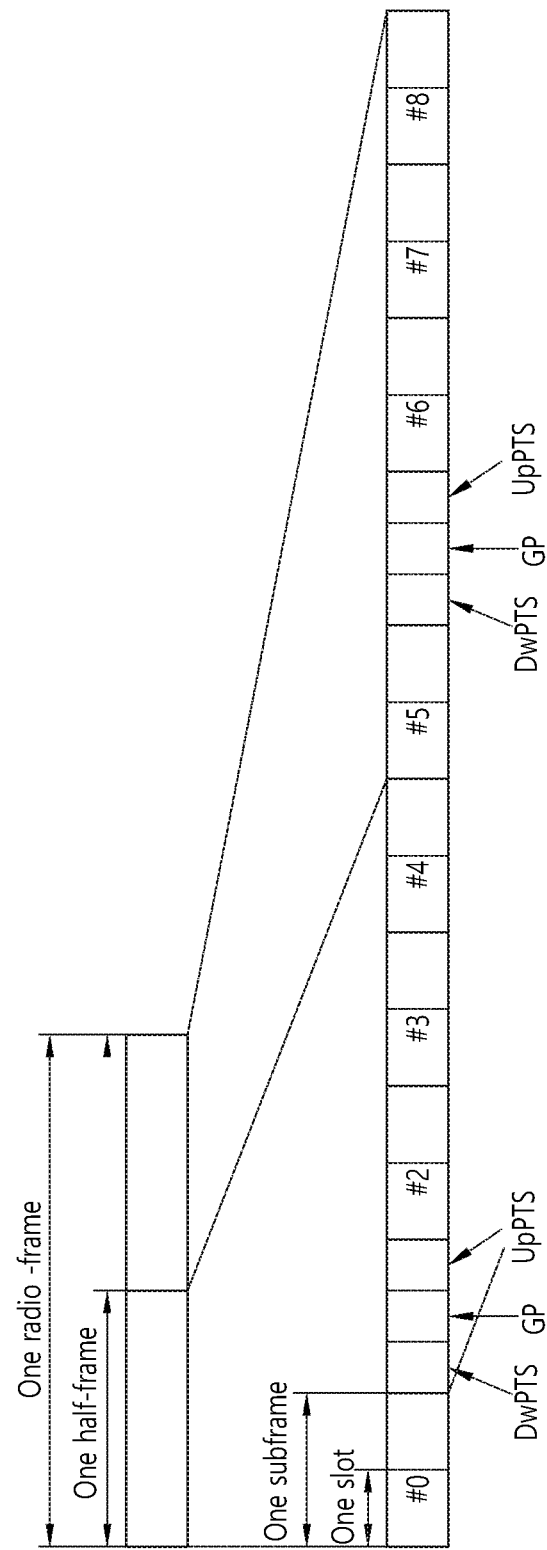
FIG. 7 shows the structure of a time division duplex (TDD) radio frame.

FIG. 7 shows the structure of a time division duplex (TDD) radio frame.

Referring to FIG. 7, a subframe having an index #1 and an index #6 is called a special subframe, and includes a downlink pilot time slot (DwPTS), a guard period (GP) and an uplink pilot time slot (UpPTS). The DwPTS is used for initial cell search, synchronization or channel estimation in a UE. The UpPTS is used for channel estimation in a base station and to perform uplink transmission synchronization of a UE. The GP is a period for removing interference occurring in the uplink due to multi-path delay of a downlink signal between the uplink and the downlink.

In TDD, downlink (DL) subframe and uplink (UL) subframe coexist within one radio frame. Table 1 shows an example of the UL-DL configuration of a radio frame.

TABLE 1

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | U | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In Table 1, "D" indicates a DL subframe, "U" indicates an UL subframe, and "S" indicates a special subframe. When an UL-DL configuration is received from a base station, a UE can be aware of whether each subframe is a DL subframe or an UL subframe in a radio frame. Hereinafter, reference may be made to Table 1 for an UL-DL configuration N (N is one of 0 to 6).

Figure 8:
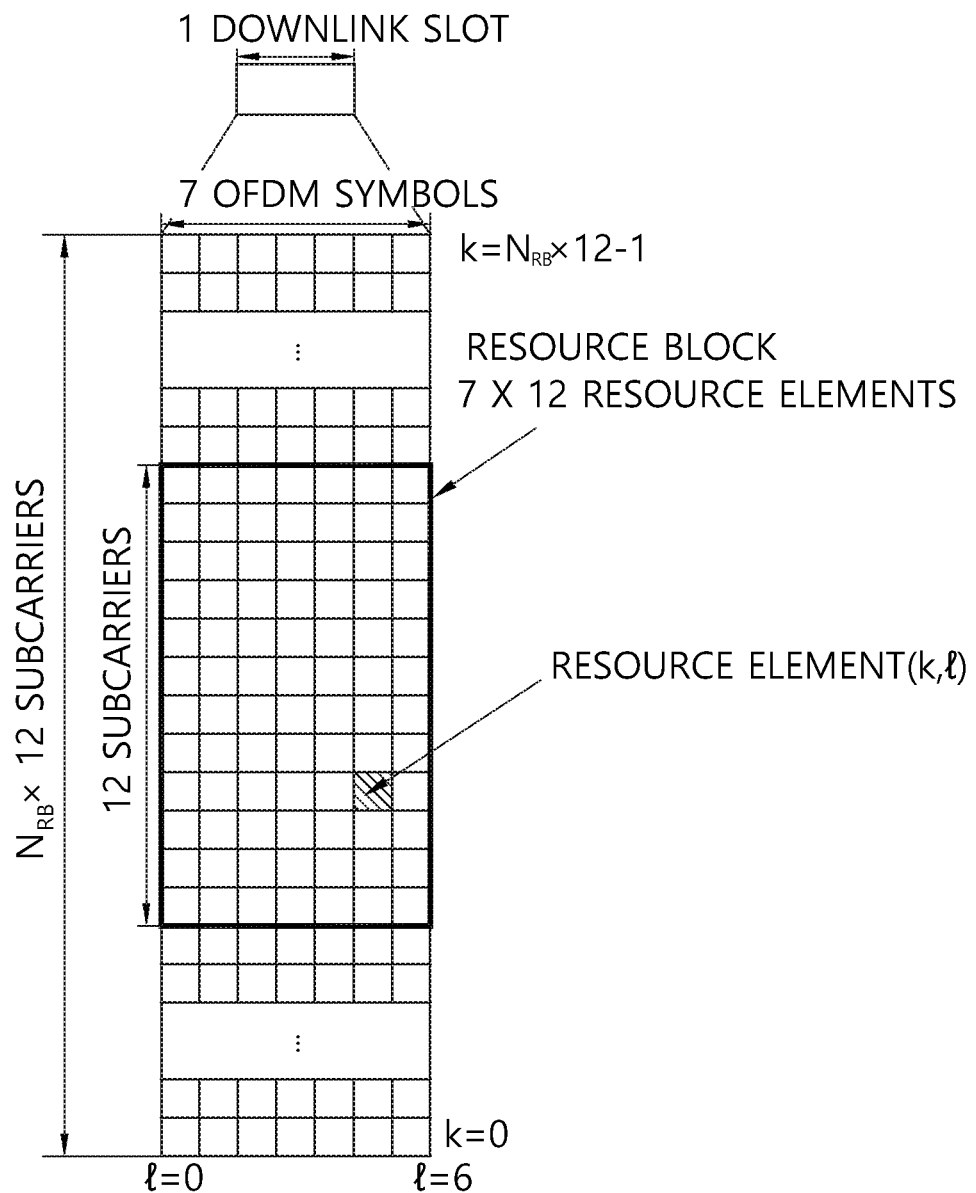
FIG. 8 is an exemplary diagram showing a resource grid for one downlink slot.

FIG. 8 is an exemplary diagram showing a resource grid for one downlink slot.

In a radio frame, one slot includes a plurality of orthogonal frequency division multiplexing (OFDM) symbols in a time domain. An OFDM symbol is for representing one symbol period because it 3GPP LTE uses OFDMA in the downlink, and may be called a different name depending on a multi-access method. For example, if SC-FDMA is used, an OFDM symbol may be called an SC-FDMA symbol. One slot is illustrated as including 7 OFDM symbols, but the number of OFDM symbols included in one slot may be different depending on the length of a cyclic prefix (CP). According to 3GPP TS 36.211 V8.5.0 (2008 December), in a normal CP, 1 subframe includes 7 OFDM symbols. In an extended CP, 1 subframe includes 6 OFDM symbols.

Furthermore, one slot includes a plurality of resource blocks (RB) in a frequency domain. A resource block is a resource assignment unit and includes a plurality of consecutive subcarriers in one slot. In a resource block, subcarrier may have a spacing of 15 KHz, for example.

Each element on the resource grid is called a resource element (RE). One resource block includes 12×7 resource elements. The number of resource blocks $N_{DL}$ included in a downlink slot depends on a downlink transmission bandwidth configured in a cell. The resource grid described in FIG. 8 may be applied to the uplink.

Figure 9:
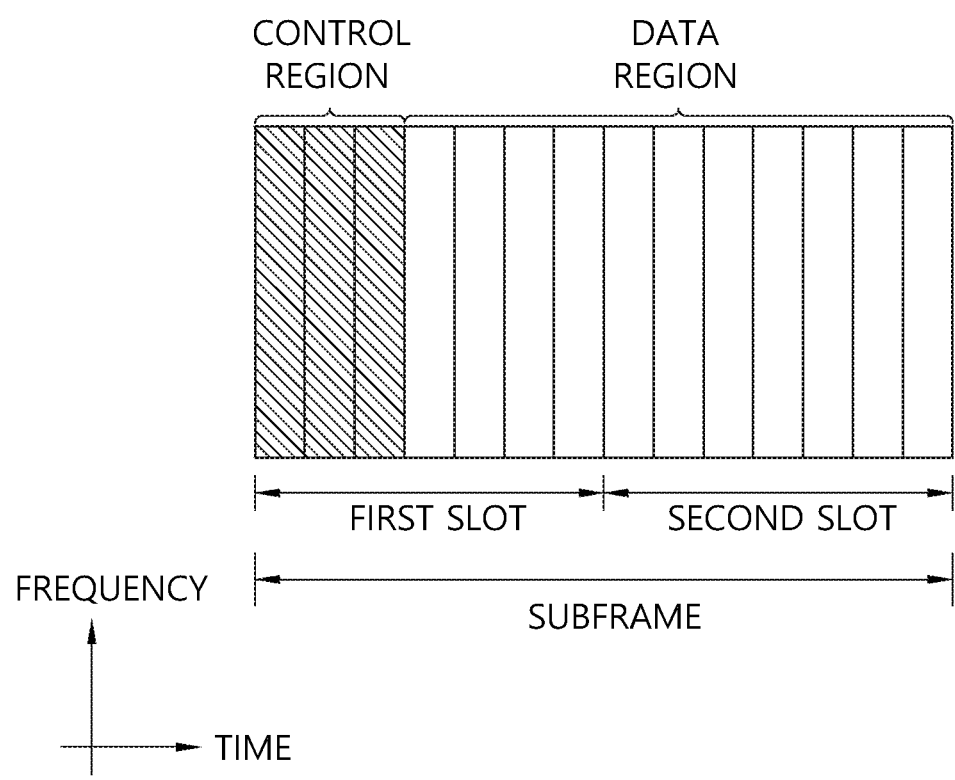
FIG. 9 shows the structure of a downlink subframe.

FIG. 9 shows the structure of a downlink subframe.

Referring to FIG. 9, the subframe includes two consecutive slots. In the subframe, a maximum of the former 3 OFDM symbols of the first slot correspond to a control region to which control channels are assigned, and the remaining OFDM symbols correspond to a data region to which a data channel is assigned. The control region may be configured with a maximum of 4 OFDM symbols depending on a system band.

Control channels assigned to the control region include a physical control format indication channel (PCFICH), a physical hybrid-ARQ indicator channel (PHICH), and a physical downlink control channel (PDCCH). The PCFICH is a control channel in which information indicating the size of the control region, that is, the number of OFDM symbols configuring the control region, is transmitted. The PHICH is a control channel that carries the acknowledgement/not-acknowledgement (ACK/NACK) of a UE for uplink data transmission. The PDCCH may carry the resource assignment (this is also called a downlink (DL) grant) and transmission format of a DL-downlink-shared channel (SCH), resource assignment information (this is also called an uplink (UL) grant) of an uplink shared channel (UL-SCH), paging information on a paging channel (PCH), system information on a DL-SCH, the resource assignment of a higher layer control message such as a random access response transmitted on a PDSCH, a set of transmission power control (TPC) commands for each UE within a given UE group, and the activation of a voice over Internet protocol (VoIP). Control information transmitted the PDCCH is called downlink control information (DCI).

The DCI format includes a format 0 for physical uplink shared channel (PUSCH) scheduling, a format 1 for the scheduling of one physical downlink shared channel (PDSCH) codeword, a format 1A for the compact scheduling of one PDSCH codeword, a format 1B for the compact scheduling of rank-1 transmission of a single codeword in a space multiplexing mode, a format 1C for the very compact scheduling of a DL-SCH, a format 1D for PDSCH scheduling in a multi-user space multiplexing mode, a format 2 for PDSCH scheduling in a closed-loop space multiplexing mode, a format 2A for PDSCH scheduling in an open loop space multiplexing mode, a format 3 for the transmission of a transmission power control (TPC) command of 2-bit power control for a PUCCH and a PUSCH, and a format 3A for the transmission of a TPC command of 1-bit power control for a PUCCH and PUSCH.

<V2X (Vehicle-TO-X) Communication>

As described above, in general, a D2D operation may have various advantages in the transmission and reception of signals between proximate devices. For example, a D2D UE has a high transfer rate and low delay and can perform data communication. Furthermore, a D2D operation can distribute traffic concentrated on a base station. If a UE performing a D2D operation plays a role of a relay, it can function to extend coverage of a base station. Communication related to a vehicle, including the transmission and reception of signals between vehicles through the extension of D2D communication, is specially called vehicle-to-X (V2X) communication.

In this case, for example, in the vehicle-to-X (V2X), the term "X" means a pedestrian (communication between a vehicle AND a device carried by an individual (e.g.,) hand-held terminal carried by a pedestrian, cyclist, driver or passenger)) (V2P), vehicle (communication between vehicles) (V2V), infrastructure/network (communication between a vehicle AND a roadside unit (RSU)/network (e.g.,) RSU is a transportation infrastructure entity (e.g.,) an entity transmitting speed notifications) implemented in an eNB or a stationary UE)) (V2I/N). Furthermore, for example, for convenience of description for a proposed method, a (V2P communication-related) device held by a pedestrian (or person) is named a "P-UE", and a (V2X communication-related) device installed on a vehicle is named a "V-UE." Furthermore, for example, in the present document, a term "entity" may be interpreted as a P-UE and/or a V-UE and/or an RSU (/network/infrastructure).

A V2X UE may perform message (or channel) transmission on a predefined (or signaled) resource pool. In this case, the resource pool may mean a resource(s) that is predefined for a UE to perform a V2X operation (or capable of performing a V2X operation). In this case, the resource pool may be defined from the viewpoint of a time-frequency, for example.

<S-RSSI>

A sidelink RSSI (S-RSSI) may be defined as the linear average of the total received power (in [W]) per SC-FDMA symbol observed by the UE only in the configured subchannel in SC-FDMA symbols 1, 2, . . . , 6 of the first slot and SC-FDMA symbols 0, 1, . . . , 5 of the second slot of a subframe.

In this case, the reference point of the S-RSSI may be the antenna connector of a UE.

If receiver diversity is used by a UE, a reported value may not be lower than a corresponding S-RSSI of each given diversity branch.

The S-RSSI may be applied in an RRC_IDLE intra frequency, RRC_IDLE inter frequency, RRC_CONNECTED intra frequency and/or RRC_CONNECTED inter frequency.

<PSSCH-RSRP>

PSSCH reference signal received power (PSSCH-RSRP) may be defined as the linear average over the power contributions (in [W]) of the resource elements that carry demodulation reference signals associated with PSSCH, within the PRBs indicated by the associated PSCCH).

In this case, a reference point for the PSSCH-RSRP may be the antenna connector of a UE.

If receiver diversity is used by a UE, a reported value may not be lower than corresponding PSSCH-RSRP of each given diversity branch.

The PSSCH-RSRP may be applied in an RRC_IDLE intra frequency, RRC_IDLE inter frequency, RRC_CONNECTED intra frequency and/or RRC_CONNECTED inter frequency.

In this case, power per resource element may be determined from energy received in a useful part of a symbol other than a CP.

<Channel Busy Ratio (CBR)>

A CBR measured in a subframe n may be defined as follows.

The CBR may mean a portion of a subchannel in a resource pool in which an S-RSSI measured by a UE during a subframe [n−100, n−1] is detected to exceed a preset threshold with respect to a PSSCH.

The CBR may mean a portion of a subchannel in a resource pool in which an S-RSSI measured by a UE during a subframe [n−100, n−1] is detected to exceed a preset threshold with respect to a PSSCH in a pool in which a physical sidelink control channel (PSCCH) is configured to be transmitted in not-neighboring resource blocks along with a PSSCH corresponding to a PSCCH. In this case, it may be assumed that the PSCCH pool is configured with resources having the size of two consecutive physical resource block (PRB) pairs in a frequency domain.

The CBR may be applied in an RRC_IDLE intra frequency, RRC_IDLE inter frequency, RRC_CONNECTED intra frequency and/or RRC_CONNECTED inter frequency.

In this case, a subframe index may be based on a physical subframe index.

<Channel Occupation Ratio (CR)>

A CR evaluated in a subframe n may be defined as follows.

This may mean that the number of subchannels used for the transmission of a UE, granted in a subframe [n−a, n−1] and a subframe [n, n+b] is divided by the number of subchannels configured in a transmission pool during [n−a, n+b].

The CR may be applied in an RRC_IDLE intra frequency, RRC_IDLE inter frequency, RRC_CONNECTED intra frequency and/or RRC_CONNECTED inter frequency.

In this case, a may be a positive integer, and b may mean 0 or a positive integer. a and b may be determined by a UE. In this case, "a+b+1=1000", "a>=500" may satisfy that "n+b should not exceed the last transmission opportunity of the grant for current transmission)."

In this case, the CR may be evaluated with respect to each (re)transmission.

In this case, when the CR is evaluated, a UE may assume that a transmission parameter used in a subframe n can be reused according to the existing grant in a subframe [n+1, n+b] without a packet drop.

In this case, a subframe index may be based on a physical subframe index.

In this case, the CR may be calculated in each priority level.

<Sidelink Channel Scrambling>

A PSSCH scrambling sequence generator may be initialized as $c_{init} = n_{ID}^X \cdot 2^{14} + n_{ssf}^{PSSCH} \cdot 2^9 + 510$ at the start position of each PSSCH subframe. In this case, $n_{ssf}^{PSSCH}$ indicates a (current) sidelink subframe number in a subframe pool with respect to a PSSCH.

In this case, regarding sidelink transmission modes 3 and 4, $n_{ID}^X$ is derived as a calculation equation for $\Sigma_{i=0}^{L-1} P_i \cdot 2^{L-1-i}$. This is represented as a decimal number of CRC on a PSCCH transmitted in the same subframe as a PSSCH. In this case, in the above equation, p means a parity bit in CRC generation, and L means the number of corresponding parity bits. The parity bit may be generated by one of the following cyclic generator polynomial expressions.

$g_{CRC24A}(D) = [D^{24} + D^{23} + D^{18} + D^{17} + D^{14} + D^{11} + D^{10} + D^7 + D^6 + D^5 + D^4 + D^3 + D + 1];$ $g_{CRC24B}(D) = [D^{24} + D^{23} + D^6 + D^5 + D + 1]$ for a CRC length L=24;

$g_{CRC16}(D) = [D^{16} + D^{12} + D^5 + 1]$ for a CRC length L=16.

$g_{CRC8}(D) = [D^8 + D^7 + D^4 + D^3 + D + 1]$ for a CRC length of L=8.

<Demodulation Reference Signal (DMRS) in Sidelink>

A sequence of a DM-RS associated with a PSSCH, a PSCCH, or a PSBCH may be generated as follows.

$$r_{PUSCH}^{(\lambda)}(m \cdot M_{sc}^{RS} + n) = w^{(\lambda)}(m) r_{u,v}^{(\alpha_\lambda, \delta)}(n) \quad \text{<Equation 1>}$$

In this case, m is 0 for a special subframe and 0 or 1 in other cases. n=0, . . . , $M_{sc}^{RS} - 1$. $M_{sc}^{RS}$ indicates the length of a reference signal as a subcarrier number. δ is 0 or 1. u is a sequence group number in a slot $n_s$, and v is a basic sequence number. U may be determined based on $n_{ID}^{RS}$ and $f_{ss}$.

The $\alpha_\lambda$ is a cyclic shift value in a slot $n_s$, and may be given as in the following equation.

$$\alpha_\lambda = 2\pi n_{cs,\lambda}/12 \quad \text{<Equation 2>}$$

The parameters in Equation 1 and Equation 2 may be determined as in the following table in the case of a reference signal (DM-RS) for a PSSCH.

TABLE 2

| Parameter | | PSSCH sidelink transmission mode 3 and 4 |
|---|---|---|
| Group hopping | | Enabled |
| | $n_{ID}^{RS}$ | $n_{ID}^X$ |
| | $n_s$ | First DM-RS symbol of $2n_{SS}^{PSSCH}$ slot |
| | | Second DM-RS symbol of $2n_{SS}^{PSSCH} + 1$ slot |
| | $f_{ss}$ | $\lfloor n_{ID}^{RS}/16 \rfloor \mod 30$ |
| Sequence hopping | | Disabled |
| Cyclic shift | $n_{cs,\lambda}$ | $\lfloor n_{ID}^{RS}/2 \rfloor \mod 8$ |
| Orthogonal sequence | $\lfloor w^\lambda(\cdot) \rfloor$ | [+1 +1 +1 +1] if $n_{ID}^X \mod 2 = 0$ [+1 −1 +1 −1] if $n_{ID}^X \mod 2 = 1$ |

TABLE 2-continued

| Parameter | | PSSCH sidelink transmission mode 3 and 4 |
|---|---|---|
| Length of reference signal | $M_{SC}^{RS}$ | $M_{SC}^{PSSCH}$ |
| Number of layers | υ | 1 |
| Number of antenna ports | P | 1 |

$n_{ID}^{RS}$ is an ID related to sequence group hopping. $n_s$ is a slot number, and $f_{ss}$ indicates a sequence shift pattern.

$n_{cs,\lambda}$ is a cyclic shift value. In the sidelink transmission mode 3, 4, a symbol to which a DM-RS is mapped with respect to a PSSCH and a PSCCH may be 1=2, 5 (i.e., the third symbol and the sixth symbol) in the first slot and may be 1=1, 4 (i.e., the second symbol and the fifth symbol in the second slot.

In the sidelink transmission mode 3, 4, a symbol to which a DM-RS is mapped with respect to a PSBCH may be 1=4, 6 (i.e., the fifth symbol and the seventh symbol) in the first slot and may be 1=2 (i.e., the third symbol) in the second slot.

In the sidelink transmission mode 3, 4, a pseudo-random sequence generator may be initialized at the start of each slot that satisfies $n_{ss}^{PSSCH}$ mod 2=0. $n_{ss}^{PSSCH}$ indicates a (current) sidelink slot number in a subframe pool with respect to a PSSCH.

In the sidelink transmission mode 3, 4, a cyclic shift $n_{cs,\lambda}$ to be applied to all DM-RSs within a subframe with respect to a PSCCH may be randomly selected among {0, 3, 6, 9}.

In the sidelink transmission mode 3, 4, m=0, 1, 2, 3 with respect to a PSSCH, and m=0, 1, 2 with respect to a PSBCH.

In the sidelink transmission mode 3, 4, $n_{ID}^{X}$ is the same as the decimal system expression of CRS on a PSCCH transmitted in the same subframe as a PSSCH, and may be given like the following equation.

$$n_{ID}^{X} = \Sigma_{i=0}^{L-1} p_i \cdot 2^{L-1-i}$$ <Equation 3>

In the equation, p is a parity bit, and L is the number of parity bits.

$M_{SC}^{PSSCH}$ indicates a scheduled band as the number of subcarriers for PSSCH transmission.

The parameters in Equation 1 and Equation 2 may be determined as in the following table in the case of a reference signal for a PSCCH.

TABLE 3

| Parameter | | PSCCH sidelink transmission mode 3 and 4 |
|---|---|---|
| Group hopping | | Enabled |
| | $n_{ID}^{RS}$ | — |
| | $n_s$ | — |
| | $f_{ss}$ | 8 |
| Sequence hopping | | Disabled |
| Cyclic shift | $n_{cs,\lambda}$ | {0, 3, 6, 9} |
| Orthogonal sequence | $\lfloor w^{\lambda}(\cdot) \rfloor$ | [+1 +1 +1 +1] |
| Length of reference signal | $M_{SC}^{RS}$ | $M_{SC}^{PSSCH}$ |
| Number of layers | υ | 1 |
| Number of antenna ports | P | 1 |

The parameters in Equation 1 and Equation 2 may be determined as in the following table in the case of a reference signal for a PSBCH. $N_{ID}^{SL}$ is a sidelink synchronization identity.

TABLE 4

| Parameter | | PSSCH sidelink transmission mode 3 and 4 |
|---|---|---|
| Group hopping | | Enabled |
| | $f_{ss}$ | 8 |
| Sequence hopping | | Disabled |
| Cyclic shift | $n_{cs,\lambda}$ | $\lfloor n_{ID}^{RS}/2 \rfloor \bmod 8$ |
| Orthogonal sequence | $\lfloor Lw^{\lambda}(m)L \rfloor$ | [+1 +1 +1] if $n_{ID}^{SL}$ mod 2 = 0 |
| | | [+1 −1 +1] if $n_{ID}^{SL}$ mod 2 = 1 |
| Length of reference signal | $M_{SC}^{RS}$ | $M_{SC}^{PSSCH}$ |
| Number of layers | υ | 1 |
| Number of antenna ports | P | 1 |

Hereinafter, the present document is described.

For example, the following proposed methods propose efficient RS sequence generation/hopping and/or scrambling methods if relatively short transmission time interval (S-TTI)-based V2X communication (compared to the existing (e.g., "1MS")) is performed.

In this case, for example, a V2X communication mode may be divided into (A) a mode in which a base station signals (/controls) V2X message transmission (/reception)-related scheduling information (on a V2X resource pool pre-configured (/pre-signaled)) (representatively) (from (the base station (/network)) (MODE #3) (e.g., a UE positioned within base station communication coverage (and/or of an RRC_CONNECTED state) is a main target) and/or (B) a mode in which a UE (autonomously) determines (/controls) V2X message transmission (/reception)-related scheduling information (a V2X resource pool pre-configured (/pre-signaled) from a base station (/network)) (MODE #4) (e.g., a UE positioned inside/outside base station communication coverage (and/or of an RRC_CONNECTED/IDLE state) is a main target).

In this case, for example, in the present document, the wording "sensing operation" may be interpreted as a PSSCH DM-RS sequence-based PSSCH-RSRP measurement operation (scheduled by a decoding-successful PSCCH) and/or a (V2X resource pool-related subchannel-based) S-RSSI measurement operation.

In this case, for example, in the present document, the wording "reception" may be (extended) interpreted as (at least) one of (A) a V2X channel (/signal) (e.g., PSCCH, PSSCH, PSBCH, PSSS/SSSS) decoding (/reception) operation (and/or WAN DL channel (/signal) (e.g., PDCCH, PDSCH, PSS/SSS) decoding (/reception) operation) and/or (B) a sensing operation and/or (C) a CBR measurement operation. In this case, for example, in the present document, the wording "transmission" may be (extended) interpreted as V2X channel (/signal) (e.g., PSCCH, PSSCH, PSBCH, PSSS/SSSS) transmission operation (and/or WAN UL channel (/signal) (e.g., PUSCH, PUCCH, SRS) transmission operation).

In this case, for example, in the present document, the wording "carrier" may be (extended) interpreted as (A) a pre-configured (/pre-signaled) carrier set (/group) and/or (B) a V2X resource pool. In this case, for example, in the present document, the wording "RS" may be interpreted (at least) as a DM-RS. In this case, for example, in the present document, the wording "scrambling" may be interpreted as (at least) PSSCH (/PSCCH) scrambling.

As described above, hereinafter, the definition of terms of the specification to be described and abbreviations of the terms may be defined in 3gpp TS 36 series unless described otherwise. Among the terms, terms to be used more frequently in the context of the specification may be separately defined as follows.

S-PSCCH_L: may mean the number of symbols configuring an S-TTI-based PSCCH.

S-PSSCH_L: may mean the number of symbols configuring an S-TTI-based PSSCH.

S-PSCCH, S-PSSCH: may mean an S-TTI-based PSCCH, PSSCH.

L-PSCCH, L-PSSCH: may mean the existing 1MS TTI (or a TTI relatively longer than an S-TTI) (L-TTI)-based (LEGACY) PSCCH, PSSCH.

L-N_SS: an L-SLOT index (e.g., $n_{ss}^{PSSCH}$) used for DM-RS sequence generation/sequence (group) hopping on (LEGACY) SLOT (L-SLOT) upon L-TTI (or a TTI relatively longer than an S-TTI)-based transmission L-N_SSF: an L-TTI index (e.g., $n_{ssf}^{PSSCH}$) used for scrambling on an L-TTI upon L-TTI (or a TTI relatively longer than an S-TTI)-based transmission S-N_SS: an index used for DM-RS sequence generation/hopping on an S-TTI upon S-TTI-based transmission S-N_SSF: an index used for scrambling on an S-TTI upon S-TTI-based transmission Hereinafter, examples of (relatively) short TTI and (relatively) long TTIs are described.

In a future wireless communication system, variable TTIs (channels/signals) may be introduced by considering the traffic (or data) of various transmission coverage/reliability/latency requirements. For example, after a basic resource unit is predefined (/pre-configured), a single (data-related channel/signal transmission having specific requirement) TTI or a combination of TTIs of a plurality of basic resource units may be defined. In this case, examples of the TTIs are described below with reference to the drawings.

Figure 10:
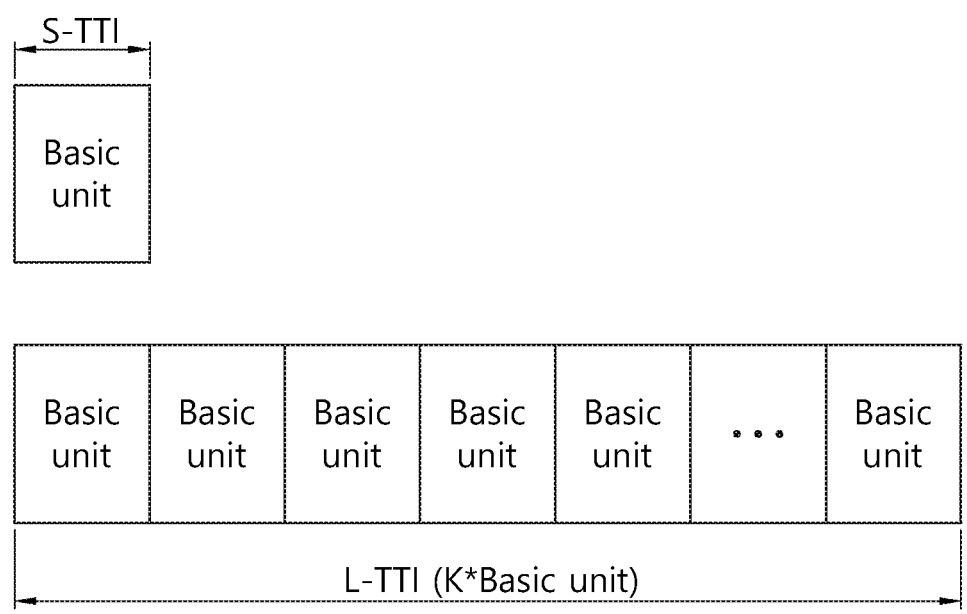
FIG. 10 schematically illustrates an example of an S-TTI and an L-TTI.

FIG. 10 schematically illustrates an example of an S-TTI and an L-TTI.

Referring to FIG. 10, if an S-TTI is defined as a pre-configured (/pre-signaled) basic resource unit, an L-TTI may be interpreted as a form in which (pre-configured (/pre-signaled)) K S-TTIs (basic resource unit) have been combined.

Figure 11:
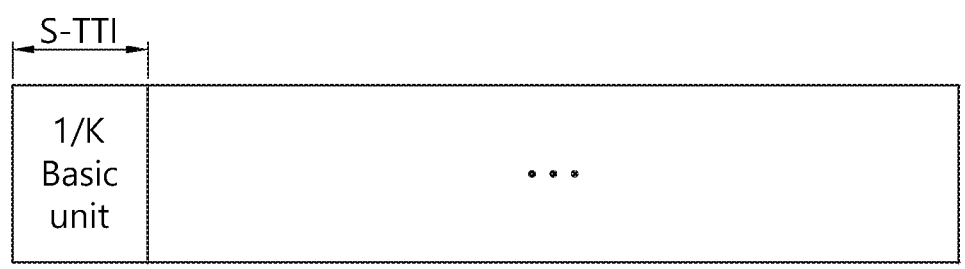
FIG. 11 schematically illustrates an example of an S-TTI and an L-TTI.
Figure 11:
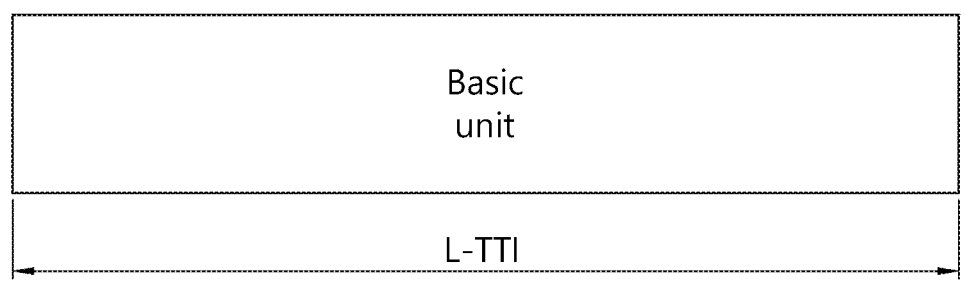

FIG. 11 schematically illustrates an example of an S-TTI and an L-TTI.

Referring to FIG. 11, if an L-TTI is defined as a pre-configured (/pre-signaled) basic resource unit, an S-TTI may be interpreted as a form in which the L-TTI (basic resource unit) has been divided into (pre-configured (/pre-signaled)) K (e.g., a kind of mini-basic resource unit).

Unlike in the above figure, an S-TTI may have a form in which a plurality of (pre-configured (/pre-signaled)) basic resource units has been combined.

Figure 12:
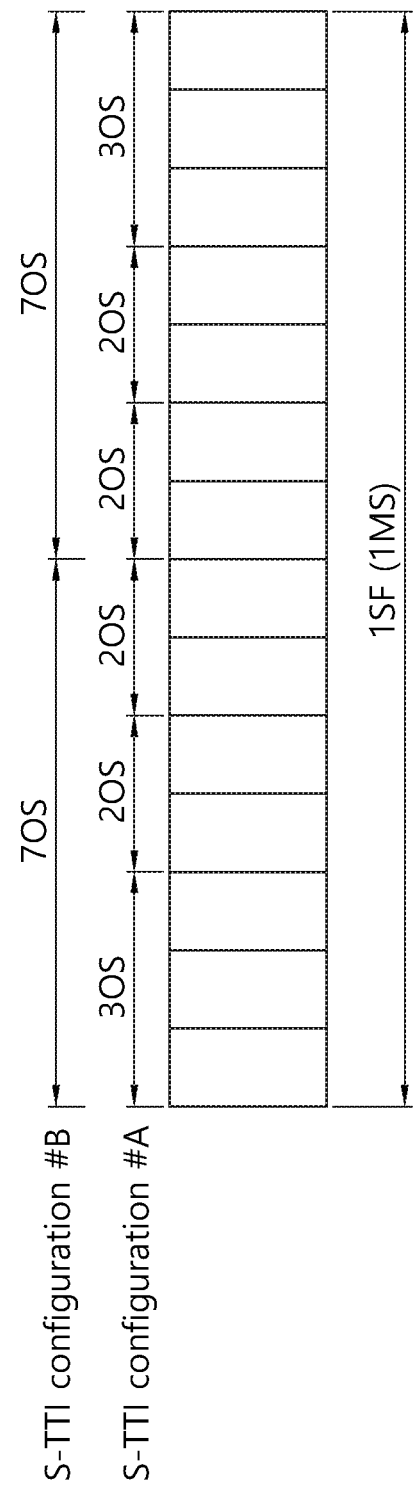
FIG. 12 schematically illustrates an example of an S-TTI and an L-TTI.

FIG. 12 schematically illustrates an example of an S-TTI and an L-TTI.

Referring to FIG. 12, for example, as in an S-TTI configuration #A, the first S-TTI may have the length of three OFDM symbols (OS), the second S-TTI may have the length of two OFDM symbols, the third S-TTI may have the length of two OFDM symbols, the fourth S-TTI may have the length of two OFDM symbols, the fifth S-TTI may have the length of two OFDM symbols, and the sixth S-TTI may have the length of three OFDM symbols.

Or for example, as in an S-TTI configuration #B, the first S-TTI may have the length of seven OFDM symbols, and the second S-TTI may have the length of seven OFDM symbols.

Various examples related to the relation between an S-TTI and an L-TTI have been illustrated. However, the above-described examples of various S-TTIs and L-TTIs are merely examples for convenience of description, and forms of an S-TTI and L-TTI are not limited thereto.

As described above, in a future communication system, if (relatively) short TTI-based V2X communication (/channel/signal) compared to a conventional one is introduced, it is necessary to define that a UE will generate and/hop a (short TTI-based channel/signal-related) DMRS sequence using which method and will perform channel scrambling using which method. For example, an interference randomization degree that affects (or is provided by) a short TTI-based channel/signal may be different or interference (randomization/pattern) that affects different TTI length (or relatively long TTI)-based channels/signals coexisting on the same V2X resource pool may be different depending on how corresponding rules are defined.

Hereinafter, regarding DMRS sequence generation and/or hopping, how an S-TTI-based UE will use an S-TTI or an L-TTI as a parameter used for DMRS sequence generation and/or hopping by considering the issues is described with reference to the drawings below. Furthermore, regarding channel scrambling, how an S-TTI-based UE will use an S-TTI or an L-TTI as a parameter used for channel scrambling is described with reference to the drawings below.

Figure 13:
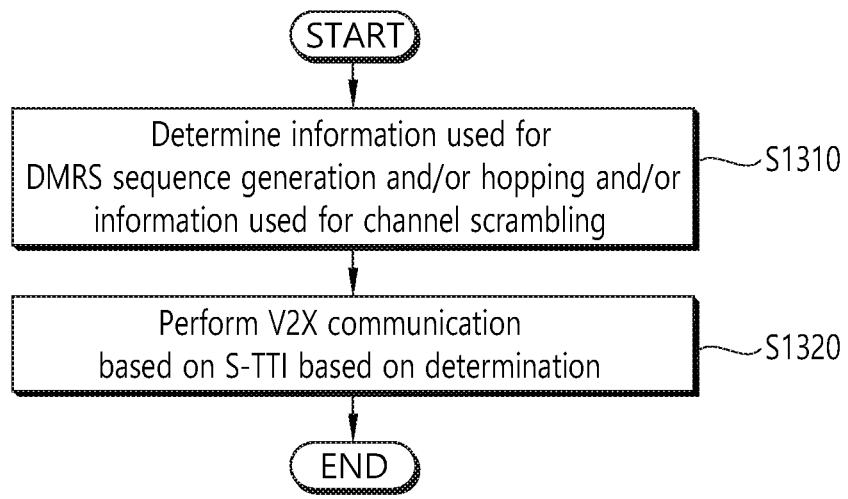
FIG. 13 is a flowchart of a method of performing V2X communication based on an S-TTI according to an embodiment of the present document.

FIG. 13 is a flowchart of a method of performing V2X communication based on an S-TTI according to an embodiment of the present document.

Referring to FIG. 13, a V2X UE determines a parameter used for DMRS sequence generation and/or hopping and/or a parameter used for channel scrambling (S1310). In this case, the parameter used for DMRS sequence generation and/or hopping may be represented as "information used for DMRS sequence generation and/or hopping", for convenience of description. The parameter used for channel scrambling may be represented "information channel scrambling", for convenience of description. In summary, hereinafter, the term "parameter" and the term "information" may be interchangeably used, for convenience of description.

In this case, the V2X UE may mean a UE supporting V2X communication based on a relatively short TTI. The V2X UE may be a UE supporting V2X communication based on the existing (or relatively long) TTI in addition to V2X communication based on a relatively short TTI.

In this case, the parameter used for DMRS sequence generation and/or hopping and/or the parameter used for channel scrambling may be pre-configured for a UE. Or, the parameter used for DMRS sequence generation and/or hopping and/or the parameter used for channel scrambling may be configured through separate signaling from a network (e.g., base station).

In this case, it is assumed that 1 L-TTI is configured with K S-TTIs (i.e., it is assumed that a total of K*10 S-TTIs are present within 1 radio frame).

Hereinafter, 1. Examples of information used for DMRS sequence generation (and/or hopping) and 2. Examples of information used for channel scrambling are described.

1. Information Used for DMRS Sequence Generation and/or Hopping

The S-N_SSF value of a Q-th (Q<K) S-TTI on an L-TTI #N (0≤N≤9) within 1 radio frame may be determined by the following rule. (e.g., the S-N_SSF value is used as an RS sequence group hopping function-related input parameter on an S-TTI).

For example, there may be 1) a method of assigning a different S-N_SS for each S-TTI as in (Rule#A) to be described later, and 2) a method in which a plurality of S-TTIs has an L-N_SS #J as an S-N_SS in common within an 1 L-SLOT (L-N_SS #J) as in (Rule#B) to be described later. Hereinafter, each of the examples is described more specifically.

1) (Rule#A) a Method of Assigning a Different S-N_SS for Each S-TTI and Sequentially Increasing it within 1 Radio Frame That is, when a UE performs V2X communication based on an S-TTI, it may perform DMRS sequence group hopping (and/or generation) using information on DMRS sequence group hopping (and/or generation) defined in an S-TTI unit.

In this case, the information (i.e., S-N_SS) on DMRS sequence group hopping (and/or generation) may be represented as follows in terms of equation.

$$S\text{-}N\_SS=(N*K+Q-1) \qquad \text{[Mathematical expression]:}$$

That is, the S-N_SSF value range of an S-TTI may become [0, (9*K+K−1)] within one radio frame.

Furthermore, the following rule may be followed when a pseudo-random sequence generator is initialized.

(1) initialization for each S-TTI (or a pre-configured (/pre-signaled) number of S-TTI bundles)

(2) initialization for each L-TTI (e.g., the same as the existing REL-14 operation)

For convenience of understanding, an example in (Rule#A) is described with reference to the drawings below.

[Rule#A figure example]: if 1 L-TTI is configured with 6 S-TTIs (K=6)

Figure 14:
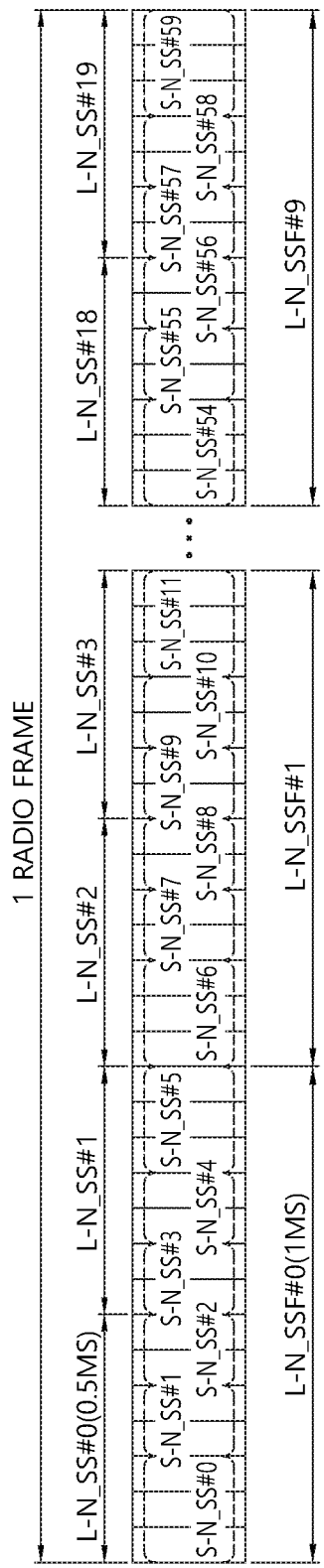
FIG. 14 schematically illustrates an example of a method of assigning an S-N_SSF value according to (Rule#A).

FIG. 14 schematically illustrates an example of a method of assigning an S-N_SSF value according to (Rule#A).

Referring to FIG. 14, one radio frame may have a total of 10 legacy subframes (L-TTI). In this case, the legacy subframes may have values from an L-N_SSF #0 to an L-N_SSF #9.

One legacy subframe may include two legacy slots (L-SLOT). In this case, legacy slots within one radio frame may have sequentially increasing values. For example, one radio frame may include legacy slots having values from an L-N_SS #0 to an L-N_SS #19.

If a legacy subframe is configured with 14 OFDM symbols, for example, the first S-TTI may have the length of three OFDM symbols (OS), the second S-TTI may have the length of two OFDM symbols, the third S-TTI may have the length of two OFDM symbols, the fourth S-TTI may have the length of two OFDM symbols, the fifth S-TTI may have the length of two OFDM symbols, and the sixth S-TTI may have the length of three OFDM symbols.

In such a condition, one radio frame may include a total of 60 S-N_SSs. In this case, values of the S-N_SSs may sequentially increase. That is, one radio frame may have values from an S-N_SS #0 to an S-N_SS #59.

As in (Rule#A), if a different S-N_SS is assigned for each S-TTI and the S-N_SSs sequentially increase within one radio frame, the randomization of DMRS sequence group hopping (and/or generation) can be increased. That is, if a different S-N_SS is assigned for each S-TTI and the S-N_SSs sequentially increase within one radio frame, interference that affects (is affected by) an SDMRS sequence can be efficiently randomized.

2) (Rule#B) a method in which a plurality of S-TTIs within 1 L-SLOT (L-N_SS #J) has an L-N_SS #J as an S-N_SS in common That is, when a UE performs V2X communication based on an S-TTI, it may perform DMRS sequence group hopping (and/or generation) using information on DMRS sequence group hopping (and/or generation) defined in an L-SLOT unit.

In this case, information (i.e., S-N_SS) on DMRS sequence group hopping (and/or generation) may be represented as follows in terms of equation. For example, a case where a Q-th S-TTI on an L-TTI #N belongs to an L-N_SS #J (J=2*N or J=2*N+1) is represented as follows in terms of equation.

$$S\text{-}N\_SS=(N*2+(J \text{ MODULO } 2)) \text{ (In this case, } 0 \le J \le 19) \qquad \text{[Mathematical expression]:}$$

That is, the S-N_SSF value of an S-TTI within one radio frame may have a [0, (9*2+1)] range.

Furthermore, the following rule may be followed when a pseudo-random sequence generator is initialized.

(1) initialization for each L-TTI (the same as the existing REL-14 operation)

(2) initialization for each L-SLOT (or a pre-configured (/pre-signaled) number of L-SLOT bundles)

In this case, this may be extended to a method in which a plurality of pre-configured (/pre-signaled) (X) S-TTIs has the same S-N_SSF value.

In this case, information (i.e., S-N_SS) on DMRS sequence group hopping (and/or generation) may be represented as follows in terms of equation. For example, a case where a Q-th S-TTI on an L-TTI #N is a W-th (W<K*10) S-TTI among a total of K*10 S-TTIs within one radio frame is represented as follows in terms of equation.

$$S\text{-}N\_SS=(W \text{ MODULO } X) \qquad \text{[Mathematical expression]:}$$

(1) an X value may be defined as a total number of S-TTIs configuring one L-SLOT (or L-TTI)

(2) an X value may be a pre-signaled (/pre-set) value

Furthermore, the following rule may be followed when a pseudo-random sequence generator is initialized.

For example, a pseudo-random seq. generator initialization may be initialized every X S-TTI bundle (or S-TTI) or may be initialized every L-TTI.

For convenience of understanding, an example of (Rule#B) is described with reference to the drawing below.

[Rule#B figure example]: a case where 1 L-TTI is configured with 6 S-TTIs (K=6)

Figure 15:
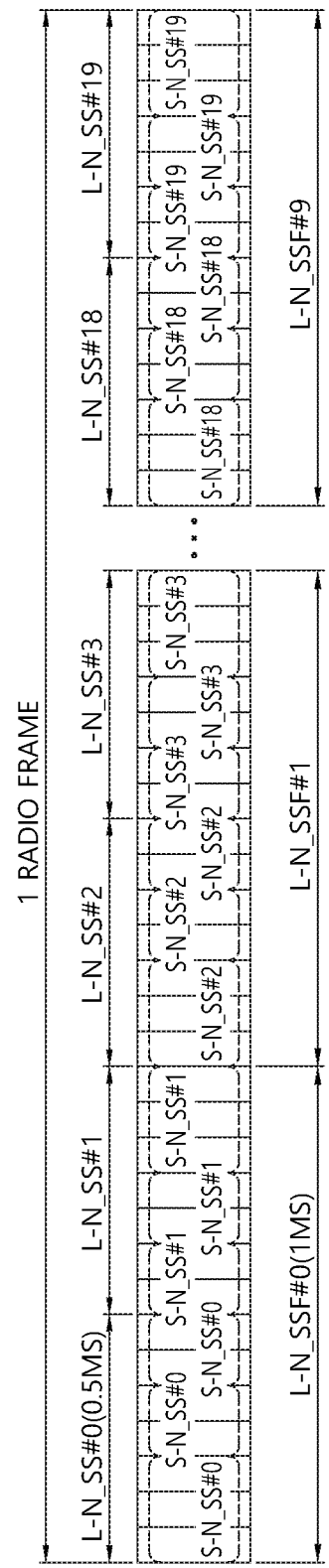
FIG. 15 schematically illustrates an example of a method of assigning an S-N_SSF value according to (Rule#B).

FIG. 15 schematically illustrates an example of a method of assigning an S-N_SSF value according to (Rule#B).

Referring to FIG. 15, one radio frame may have a total of 10 legacy subframes (L-TTI). In this case, the legacy subframes may have values from an L-N_SSF #0 to an L-N_SSF #9.

One legacy subframe may include two legacy slots (L-SLOT). In this case, the legacy slots may have sequentially increasing values within one radio frame. For example, one radio frame may include legacy slots having values from an L-N_SS #0 to an L-N_SS #19.

If a legacy subframe is configured with 14 OFDM symbols, for example, the first S-TTI may have the length of three OFDM symbols (OS), the second S-TTI may have the length of two OFDM symbols, the third S-TTI may have the length of two OFDM symbols, the fourth S-TTI may have the length of two OFDM symbols, the fifth S-TTI may have the length of two OFDM symbols, and the sixth S-TTI may have the length of three OFDM symbols.

In such a condition, S-N_SSs belonging to the index (i.e., L-N_SS) of the same legacy slot may have the same value (as a legacy slot index).

For example, all S-TTIs belonging to a legacy TTI corresponding to an L-N_SS #0 may have a value of an S-N_SS #0. All S-TTIs belonging to a legacy TTI corresponding to an L-N_SS #1 may have a value of an S-N_SS #1. In this case, one radio frame may include an S-N_SS #1 to an S-N_SS #19.

As in (Rule#B), if a method in which a plurality of S-TTIs has an L-N_SS #J as an S-N_SS in common within 1 L-SLOT (L-N_SS #J) is followed, if a method in which a plurality of S-TTIs has an L-N_SS #J as an S-N_SS in common within 1 L-SLOT (L-N_SS #J) is followed, when a UE performs V2X communication based on an S-TTI, it may use a sequence generator for a legacy UE, for example. Accordingly, the complexity of the design can be reduced because a separate design for a sequence generator for an S-TTI is not necessary.

2. Information Used for Channel Scrambling

An S-N_SSF value of a Q-th (Q<K) S-TTI on an L-TTI #N (O<N<9) within one radio frame may be determined by the following rule. (used when a C_INIT value is calculated in relation to scrambling function initialization on an S-TTI)

For example, there may be 1) a method of assigning a different S-N_SSF for each S-TTI, 2) a method of identically determining an S-N_SSF value of a corresponding S-TTI as "P" if the S-N_SSF value of a Q-th S-TTI is determined as "P", and 3) a method in which a plurality of pre-configured (X) S-TTIs has the same S-N_SSF value. Hereinafter, each of the examples is described more specifically below.

1) Method of assigning a different S-N_SSF for each S-TTI

A different S-N_SSF value may be assigned to a value of information used for channel scrambling (i.e., S-N_SSF) for each S-TTI. For example, in this case, the S-N_SSF value may sequentially increase in one frame.

2) (Rule#C) Method of identically determining an S-N_SSF value of a corresponding S-TTI as "P" if an S-N_SSF value of a corresponding Q-th S-TTI is determined as "P"

That is, the value of the S-N_SSF may be determined identically with the S-N_SSF value. In this case, information used for channel scrambling may be represented as follows in terms of equation.

$$S\text{-}N\_SSF = S\text{-}N\_SS \quad \text{[Mathematical expression]}:$$

In particular, this may be useful when an S-N_SSF value is determined according to the Rule#A.

A scrambling seq. generator initialization rule may be as follow.

(1) Initialization every S-TTI (or a pre-configured number of S-TTI bundles)

(2) Initialization every L-TTI (the same as the existing REL-14 operation)

Or, another example may be present as follows.

3) (Rule#D) Method in which a plurality of pre-configured (X) S-TTIs has the same S-N_SSF value An example in which a Q-th S-TTI on an L-TTI #N is a W-th (W<K*10) S-TTI among a total of K*10 S-TTIs within one radio frame is described below through an equation.

$$S\text{-}N\_SSF = (W \text{ MODULO } X) \quad \text{[Mathematical expression]}:$$

(1) An X value may be defined a total number of S-TTIs that configure one L-TTI (or L-SLOT)

(2) An X value may be a pre-signaled (/preset) value

A scrambling seq. generator initialization rule may be as follows.

(1) Initialization every X S-TTI bundle (or S-TTI)

(2) Initialization every L-TTI (the same as the existing REL-14 operation)

Thereafter, the V2X UE may perform V2X communication based on the S-TTI based on the determination (S1320).

For example, the V2X UE performs DMRS sequence generation and/or hopping using information on DMRS sequence generation and/or hopping defined in an S-TTI unit. In this case, when the V2X UE determines information used for channel scrambling, it may adopt a method of assigning a different S-N_SSF to each S-TTI, a method of identically determining an S-N_SSF value of a corresponding S-TTI as "P" if an S-N_SSF value of a Q-th S-TTI is determined as "P", or a method in which a plurality of pre-configured (X) S-TTIs has the same S-N_SSF value.

Or for example, the V2X UE performs DMRS sequence generation and/or hopping using information on DMRS sequence generation and/or hopping defined in an L-SLOT unit. In this case, when the V2X UE determines information used for channel scrambling, it may adopt a method of assigning a different S-N_SSF to each S-TTI, a method of identically determining an S-N_SSF value of a corresponding S-TTI as "P" if an S-N_SSF value of a Q-th S-TTI is determined as "P", or a method in which a plurality of pre-configured (X) S-TTIs has the same S-N_SSF value.

If (some of) the above proposed method are applied, a maximum SF (/TTI) index of an S-TTI may be determined using a "MODULO 10 (e.g., slot indices 0-19) (or 32 (e.g., slot indices 0-63) or 16 (e.g., slot indices 0-31))" (e.g., an input parameter input to the pseudo-random seq. generator) method.

A value of an S-N_SS and/or an S-N_SSF (and/or L-N_SS and/or L-N_SSF) (in (some) of the proposed methods) may be pre-configured (/pre-signaled) (from a network).

V2X communication based on an S-TTI using (some of or all) the proposed methods may be performed depending on whether V2X communication based on an S-TTI and V2X communication based on an L-TTI coexist. This is described below with reference to the drawing.

Figure 16:
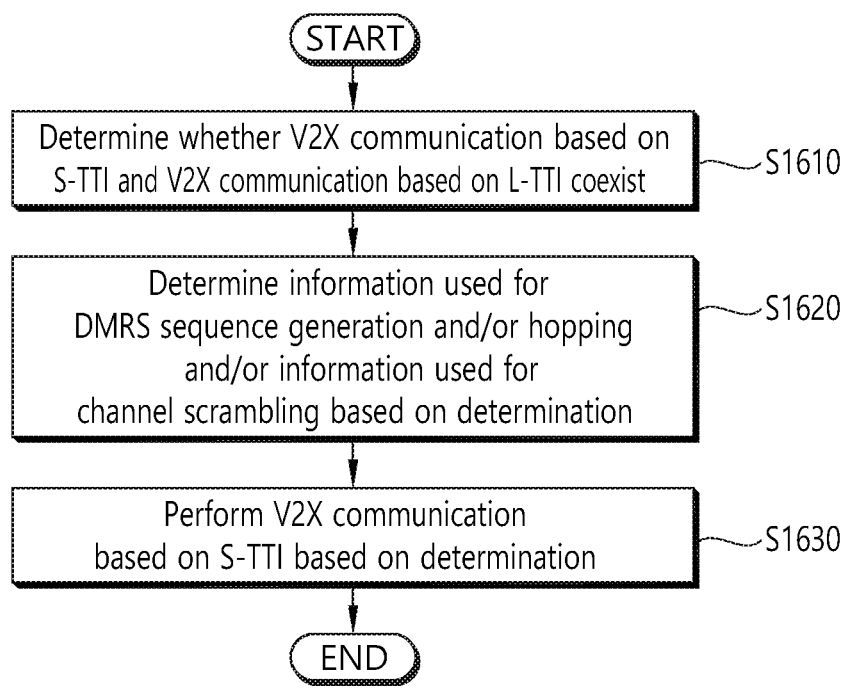
FIG. 16 is a flowchart of a method of performing V2X communication based on an S-TTI according to another embodiment of the present document.

FIG. 16 is a flowchart of a method of performing V2X communication based on an S-TTI according to another embodiment of the present document.

Referring to FIG. 16, a UE determines whether V2X communication based on an S-TTI and V2X communication based on an L-TTI coexist (S1610). In this case, the UE may mean a UE (i.e., advanced UE) performing V2X communication based on an S-TTI.

Thereafter, the UE may determine a parameter used for DMRS sequence generation (and/or hopping) and/or a parameter used for channel scrambling based on the determination (S1620).

For example, if V2X communication based on an S-TTI and V2X communication based on an L-TTI do not coexist, a UE does not need to consider that a legacy UE is influenced by V2X communication of the UE itself (or the UE is influenced by V2X communication of the legacy UE). Accordingly, the UE may determine information used for DMRS sequence generation and/or hopping based on an S-TTI and information used for channel scrambling based on an S-TTI, as information for performing V2X communication based on an S-TTI. If this is followed, DMRS sequence hopping (and/or generation) randomization can be increased.

For example, if V2X communication based on an S-TTI and V2X communication based on an L-TTI coexist, the embodiments of the information used for DMRS sequence generation and/or hopping and/or the information used for channel scrambling according to FIG. 13 may be applied.

However, the examples of the determination of information used for DMRS sequence generation and/or hopping and/or information used for channel scrambling based on whether the V2X communication based on an S-TTI and the V2X communication based on an L-TTI coexist are merely examples for convenience of description, and the present document is not limited to the examples. That is, although V2X communication based on an S-TTI and V2X communication based on an L-TTI do not coexist, the embodiments of information used for a DMRS and/or information used for channel scrambling according to FIG. 13 may be applied.

Thereafter, the UE may perform V2X communication based on an S-TTI based on the determination (S1630).

The examples of the proposed methods may be included as one of implementation methods of the present document and it is clear that the examples may be considered as a kind of proposed methods.

Furthermore, the proposed methods may be independently implemented, but may be implemented in a combination (or merge) form of some of the proposed methods.

For example, in the present document, the proposed methods have been described based on the 3GPP LTE system, for convenience of description, but the range of the system to which the proposed method is applied may be extended to systems other than the 3GPP LTE system.

For example, the proposed methods of the present document may be extended and applied for D2D communication. In this case, for example, D2D communication means that a UE directly performs communication with another UE using a radio channel. In this case, for example, the UE means the UE of a user, but may be considered as a kind of UE if network equipment, such as a base station, transmits/receives a signal according to a communication method between UEs.

Furthermore, for example, the proposed methods of the present document may be limitedly applied to a MODE 3 V2X operation (and/or MODE 4 V2X operation).

Furthermore, for example, the proposed methods of the present document may be limitedly applied to only pre-configured (/pre-signaled) (specific) V2X channel (/signal) transmission (e.g., PSSCH (and/or (associated) PSCCH and/or PSBCH)).

Furthermore, for example, the proposed methods of the present document may be limitedly applied only if a PSSCH and (associated) PSCCH are adjacently (and/or non-adjacently) transmitted (on a frequency domain) (and/or a pre-configured (/pre-signaled) MCS (and/or a coding rate and/or RB) (if transmission is performed based on a value (/range))).

Furthermore, for example, the proposed methods of the present document may be limitedly applied between only MODE #3 (and/or MODE #4) V2X carrier (and/or (MODE #4 (/3)) SL (/UL) SPS (and/or SL (/UL) dynamic scheduling) carrier).

Furthermore, for example, the proposed methods of the present document may be (limitedly) applied only if a synchronization signal (transmission (and/or reception)) resource position and/or a number (and/or V2X resource pool-related subframe position and/or number (and/or sub-channel size and/or number)) are the same (and/or (some) different) between carriers.

Figure 17:
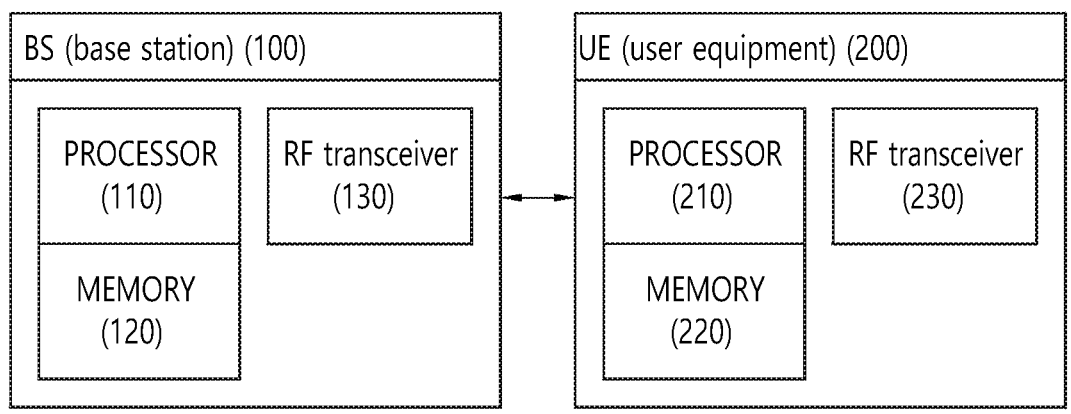
FIG. 17 is a block diagram showing a communication device in which an embodiment of the present document is implemented.

FIG. 17 is a block diagram showing a communication device in which an embodiment of the present document is implemented.

Referring to FIG. 17, a base station 100 includes a processor 110, a memory 120 and a transceiver 130. The illustrated processor, memory and transceiver may be implemented as separate chips or at least two or more blocks/functions may be implemented through one chip.

The processor 110 implements the proposed functions, processes and/or methods. The memory 120 is connected to the processor 110, and stores various pieces of information for driving the processor 110. The transceiver 130 is connected to the processor 110 and transmits and/or receives a radio signal.

A UE 200 includes a processor 210, a memory 220 and a transceiver 230. The processor 210 implements the proposed functions, processes and/or methods. The memory 220 is connected to the processor 210 and stores various pieces of information for driving the processor 210. The transceiver 230 is connected to the processor 210, and transmits and/or receives a radio signal. The UE 200 may transmit/retransmit a V2X signal to another UE according to the above-described method.

The processor 110, 210 may include application-specific integrated circuits (ASIC), other chipsets, logic circuits, data processors and/or converters for mutually converting a base-band signal and a radio signal. The memory 120, 220 may include read-only memory (ROM), random access memory (RAM), a flash memory, a memory card, a storage medium and/or other storage devices. The transceiver 130, 230 may include one or more antennas for transmitting and/or receiving a radio signal. If an embodiment is implemented in software, the scheme may be implemented as a module, process or function that performs the function. The module may be stored in the memory 120, 220 and executed by the processor 110, 210. The memory 120, 220 may be positioned inside or outside the processor 110, 210, and may be connected to the processor 110, 210 by various well-known means.

Figure 18:
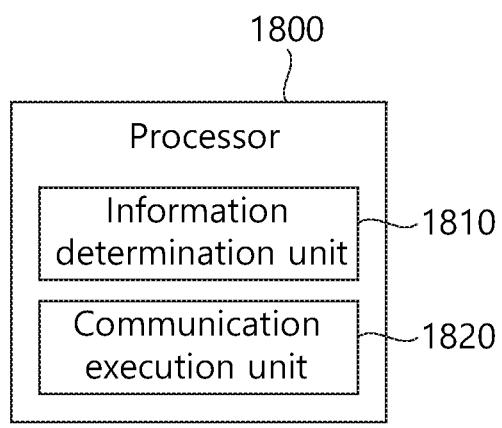
FIG. 18 is a block diagram illustrating an example of devices included in the processor.

FIG. 18 is a block diagram illustrating an example of devices included in the processor.

Referring to FIG. 18, the processor 1800 may include an information determination unit 1810 and a communication execution unit 1820 from a functional viewpoint.

In this case, the information determination unit 1810 may have a function for determining information on a demodulation reference signal (DMRS) used to perform the V2X communication based on the S-TTI and information on channel scrambling used to perform the V2X communication based on the S-TTI.

The communication execution unit 1820 may have a function for performing the V2X communication based on the S-TTI based on the determination.

The description of the devices included in the processor is merely an example, and the processor may further include other functional elements to devices. Furthermore, a detailed example of an operation performed by each of the functional devices is the same as that described above and thus a redundant description of the operation is omitted.

What is claimed is:

1. A method of performing a vehicle-to-X (V2X) communication based on a relatively short transmission time interval (S-TTI) compared to a legacy TTI (L-TTI) in a wireless communication system, the method performed by a user equipment (UE) comprising:

generating a demodulation reference signal (DMRS) sequence; and performing the V2X communication on the S-TTI based on the generated DMRS sequence, wherein the L-TTI corresponds to a plurality of S-TTIs, wherein DMRS sequence information is used for generating the DMRS sequence, wherein the DMRS sequence information is determined in unit of the S-TTI or is determined in unit of the L-TTI, wherein, based on the DMRS sequence information being determined in a unit of the S-TTI, the DMRS sequence information has a different value for each of the plurality of S-TTIs, and wherein the different value sequentially increases in one frame,
wherein the DMRS sequence information follows an equation below, the DMRS sequence information=$(N*K+Q-1)$, wherein the N is a value of an index of the L-TTI in the one frame,
wherein the N is equal to or greater than 0 and is equal to or smaller than 9,
wherein the K is a value of a number of the plurality of S-TTIs included in the L-TTI,
wherein the K has a positive integer, and
wherein the Q is a value of an index of the S-TTI in the L-TTI,
wherein the Q has a value equal to or smaller than the K.

2. The method of claim 1, wherein based on the DMRS sequence information being determined in unit of the L-TTI, the DMRS sequence information has an identical value in an identical L-TTI.

3. The method of claim 2, wherein:
the DMRS sequence information follows an equation below, the DMRS sequence information=$(N*2+(J \text{ MODULO } 2))$, wherein the N is a value of an index of the L-TTI in the one frame,
wherein the N is equal to or greater than 0 and is equal to or smaller than 9,
wherein the J is a value of an index of a slot based on the L-TTI in the one frame,
wherein the J is equal to or greater than 0 and is equal to or smaller than 19, and
wherein the MODULO is a modular operation.

4. The method of claim 3, wherein the modular operation is an operation for calculating a remainder value.

5. The method of claim 1,
wherein a channel scrambling is used for the V2X communication, and
wherein the information used for channel scrambling is determined in unit of the S-TTI.

6. The method of claim 1,
wherein, based on the S-TTI being a basic resource unit, the L-TTI is a combination of K basic resource units, and
wherein the K is a positive integer.

7. The method of claim 1,
wherein, based on the L-TTI being a basic resource unit, the S-TTI is X S-TTIs split from the basic resource unit, and
wherein the X is a positive integer.

8. A user equipment, UE, performing vehicle-to-X (V2X) communication based on a short transmission time interval (S-TTI) compared to a legacy TTI (L-TTI), the UE comprising:
a transceiver configured to transmit and receive radio signals; and
a processor operatively connected to the transceiver,
wherein the processor is configured to:
generate a demodulation reference signal (DMRS) sequence; and
perform the V2X communication on the S-TTI based on the generated DMRS sequence,
wherein the L-TTI corresponds to a plurality of S-TTIs,
wherein DMRS sequence information is used for generating the DMRS sequence,
wherein the DMRS sequence information is determined in unit of the S-TTI or is determined in unit of the L-TTI,
wherein, based on the DMRS sequence information being determined in a unit of the S-TTI, the DMRS sequence information has a different value for each of the plurality of S-TTIs, and
wherein the different value sequentially increases in one frame,
wherein the DMRS sequence information follows an equation below, the DMRS sequence information=$(N*K+Q-1)$, wherein the N is a value of an index of the L-TTI in the one frame,
wherein the N is equal to or greater than 0 and is equal to or smaller than 9,
wherein the K is a value of a number of the plurality of S-TTIs included in the L-TTI,
wherein the K has a positive integer, and
wherein the Q is a value of an index of the S-TTI in the L-TTI,
wherein the Q has a value equal to or smaller than the K.

* * * * *